(12) United States Patent
Sharples

(10) Patent No.: US 6,550,372 B1
(45) Date of Patent: Apr. 22, 2003

(54) FOOD PROCESSOR

(75) Inventor: James Henry Sharples, Hong Kong (HK)

(73) Assignee: Chiaphua Industries Limited, Tai Po (HK)

( * ) Notice: Subject to any disclaimer, the term of this patent is extended or adjusted under 35 U.S.C. 154(b) by 0 days.

(21) Appl. No.: 10/189,765

(22) Filed: Jul. 8, 2002

(51) Int. Cl.$^7$ .............................. A23L 1/00; A47J 27/05
(52) U.S. Cl. .............................. 99/331; 99/348; 99/413; 99/415; 366/144; 366/288; 366/300; 366/301; 366/309; 366/313
(58) Field of Search .................. 99/330–333, 337, 99/338, 348, 410–417, 492, 483; 366/144–149, 288, 287, 297–301, 309–313; 241/37.5, 92, 101.1, 101.2

(56) References Cited

U.S. PATENT DOCUMENTS

| | | | | |
|---|---|---|---|---|
| 5,074,201 A | * | 12/1991 | Takeyama et al. | 99/348 X |
| 5,228,381 A | * | 7/1993 | Virgilio et al. | 99/331 |
| 5,233,916 A | * | 8/1993 | Butler | 366/149 X |
| 5,284,085 A | * | 2/1994 | Palm | 99/348 |
| 5,613,774 A | * | 3/1997 | Chandra et al. | 366/144 X |
| 5,782,558 A | * | 7/1998 | Roberts | 99/337 X |
| 5,794,524 A | * | 8/1998 | Kemker et al. | 99/413 X |
| 5,852,965 A | * | 12/1998 | Kim | 99/331 X |
| 6,155,161 A | * | 12/2000 | Chan | 99/348 |
| 6,234,065 B1 | * | 5/2001 | Su | 99/348 X |
| 6,345,572 B1 | * | 2/2002 | Kao | 99/337 |
| 6,374,727 B1 | * | 4/2002 | Cretors | 99/348 X |
| 6,439,760 B1 | * | 8/2002 | Langeloh et al. | 366/309 X |

* cited by examiner

Primary Examiner—Timothy F. Simone
(74) Attorney, Agent, or Firm—Leydig, Voit & Mayer, Ltd.

(57) ABSTRACT

A food processing appliance includes a reservoir to receive water, a heater to produce steam from any water in the reservoir and a food-containing vessel positioned to receive steam from the heater. The vessel has a number of apertures that are sized to allow ingress of the steam to the vessel, yet curtail egress of any pureed food in the vessel therethrough. A carrier is mounted movably with respect to the vessel and a motor causes relative movement between the carrier and the vessel. A beater extends into the vessel from the carrier.

13 Claims, 1 Drawing Sheet

FOOD PROCESSOR

BACKGROUND OF THE INVENTION

The present invention relates to a food processor. More particularly, although not exclusively, the invention relates to an appliance for cooking and then mashing potatoes or other food then keeping the food warm for a predetermined time.

Traditionally, to prepare mashed potatoes or other mashed vegetables, such as carrots, and pumpkin, peeled vegetable pieces are first boiled. Liquid is then drained from the cooked and softened vegetable pieces and they are then broken and beaten with a hand held implement. This may be a purpose-made masher, but is generally a fork. Once the vegetables have been reduced to a rough puree, other ingredients are normally added. The most commonly added ingredient is milk and optionally butter or margarine to create a cream-like texture. Olive oil can also be used for this purpose. Solid ingredients such as chopped chives, onion or even cooked bacon pieces can also be added. Additional ingredients such as salt and pepper can be added to taste.

The above traditional means of preparation is time-consuming and labour-intensive and inconvenient, especially now that much of the hollowware used to cook the vegetables is coated with a non-stick coating that is susceptible to damage by mashers and forks. Where such pans are used, it is common to transfer the cooked vegetables to a second vessel less susceptible to such damage for mashing.

Furthermore, the addition of cold milk to the softened vegetable pieces reduces the heat of the mashed vegetables.

OBJECTS OF THE INVENTION

It is an object of the present invention to overcome or substantially ameliorate at least one of the above disadvantages and/or more generally to provide an appliance that will automate some of the above-described steps.

It is a further object of the present invention to provide an improved food-processing appliance.

It is a further complementary object of the patent invention to minimise user controls in the food processing appliance.

DISCLOSURE OF THE INVENTION

There is disclosed herein a food processing appliance comprising:
a reservoir to receive water,
a heater to produce steam from any water in the reservoir,
a vessel for containing food and being positioned to receive said steam, the vessel having a plurality of apertures therethrough, the apertures being sized to allow ingress of said steam to the vessel, yet curtail egress of any pureed food in the vessel therethrough,
a carrier mounted movably with respect to the vessel,
a drive means causing relative movement between the carrier and the vessel, and
a beater extending into the vessel from the carrier.

Preferably the appliance further includes a base in which the reservoir is located, and wherein the drive means includes a motor situated in the base.

Preferably the reservoir includes a central, vertically oriented tube through which a vertical drive shaft extends to transmit output from the motor to the carrier.

Preferably the vessel also includes a central tube through which said or another vertical drive shaft extends for transmitting output of the motor to the carrier.

Preferably the central tube of the vessel has affixed to an upper end thereof a stationary gear, and wherein the beater includes a gear that meshes with the stationary gear.

Preferably another beater is mounted to the carrier and having a gear meshing with the gear of the first said beater.

The heater can have associated with it a switch to deactivate the heater upon overheating as would occur, should all water from the reservoir the depleted.

A control means can govern operation of the motor and/or heater.

Preferably a condensate collection chamber is positioned between the vessel and the reservoir.

Preferably a steam tube extends from the heater through the condensate collection chamber.

Preferably a scraper blade extends from the carrier and co-operates with the vessel to prevent accumulation of pureed vegetables on walls of the vessel.

Preferably the scraper blade causes the vegetables to be fed toward the beater.

BRIEF DESCRIPTION OF THE DRAWINGS

A preferred form of the present invention will now be described by way of example with reference to FIG. 1, which is a schematic cross-sectional elevational view of a food-processing appliance.

DESCRIPTION OF THE PREFERRED EMBODIMENT

Figure 1:
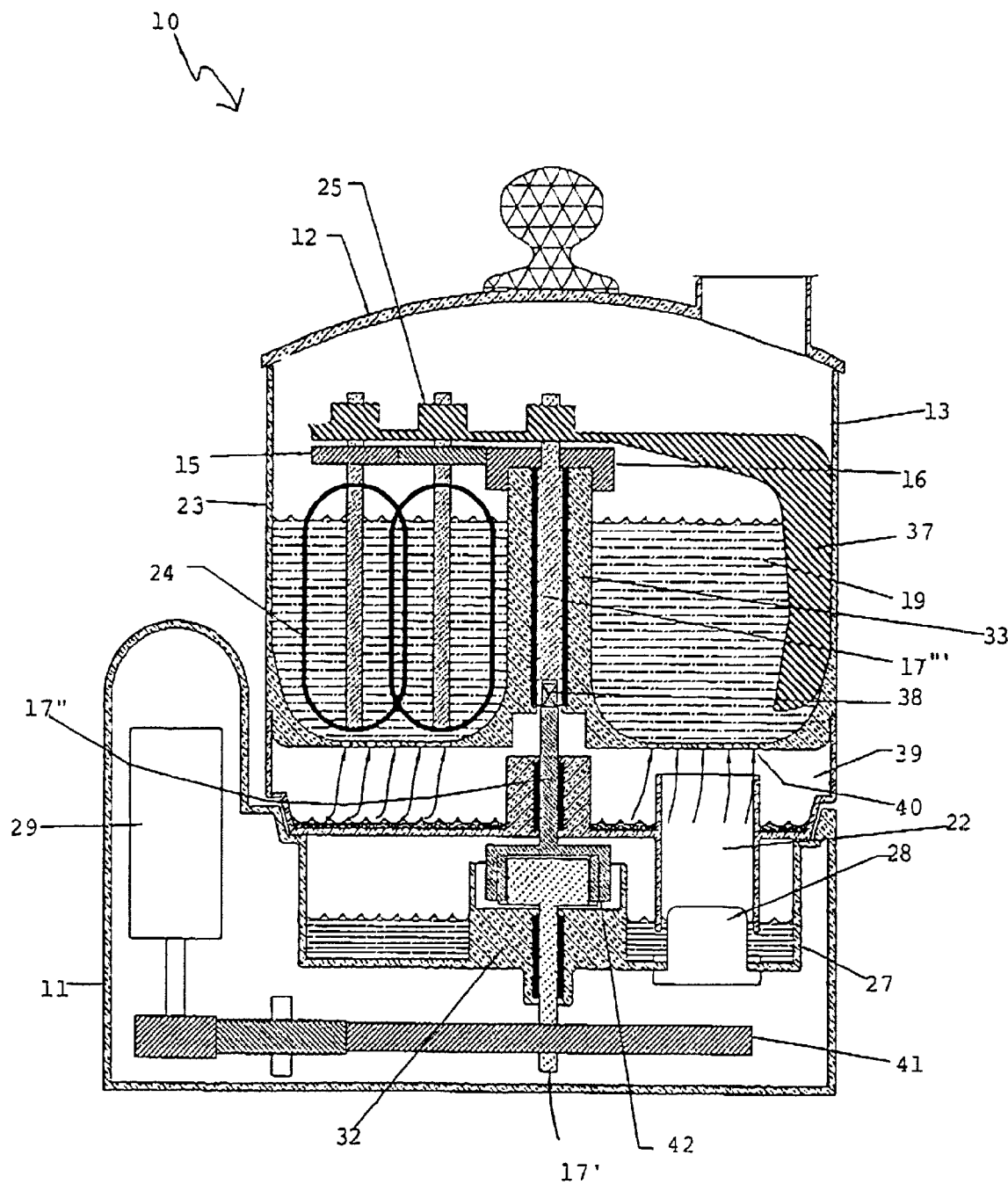

In FIG. 1 there is schematically depicted a food-processing appliance 10. Appliance 10 includes a base 11 upon which sits a vessel 23.

The base 11 might be made of moulded plastics material or other suitable material such as metal. The base 11 includes a reservoir 27 typically made of plastics in an integral moulding with the base. As an alternative, the reservoir might be made as an insert of metal such as aluminium or stainless steel.

A heater 28 fixed to the reservoir 27 creates steam from water within the reservoir.

An intermediate steam/condensate chamber 39 is provided between the cooking vessel 23 and the reservoir 27. The cooking vessel 23 has perforations 40 in its base, which communicate with the steam/condensate chamber 39. These perforations 40 are large enough to allow the ingress of steam from chamber 39 to the cooking vessel, yet small enough to prevent egress of pureed vegetables from the cooking vessel during use of the appliance. The perforations are typically about 1.5 mm in diameter.

The steam/condensate chamber 39 sits securely upon the base 11. Stepped peripheral portions interengage as depicted. In a like manner, the cooking vessel 23 fits securely upon the steam/condensate chamber.

A steam tube 22 is formed integrally with, so as to pass through, the steam/condensate chamber 39 and is positioned directly above the heater 28 to allow steam that is produced from the water in vessel 27 by heater 28 to pass upwardly into the steam/condensate chamber 39. Preferably the steam is directed upwardly at the perforations 39 by the tube.

A space beneath or alongside the reservoir 27 houses an electric motor 29 having an output shaft that engages via a gear train 41 with a vertical drive shaft segment 17' that passes through the centre post 32 of the reservoir 27. A first drive coupling 42 is fitted beneath the steam/condensate chamber 39 to transfer torque from shaft segment 17' to an intermediate shaft segment 17". In turn, another drive coupling 38 transmits torque from the intermediate shaft segment 17" to a final drive shaft segment 17''' that passes through the centre post 33 of the cooking vessel 23.

At the top of centre post 33 there is affixed a stationary gear (or sun gear) 16. Above this gear 16 the shaft has affixed thereto a carrier 25 from which there depends a pair of beaters 24. These beaters have their own gears 15 in mesh with one another, and the inner one of which is in mesh with the stationary gear 16. As an alternative construction (not illustrated), the sun gear 16, instead of being affixed to the centre post 33, could be attached to or formed integrally with the upper, inner surface of the vessel 23. Such a gear would be somewhat like a ring gear having its teeth all projecting toward a common centre point. These teeth would engage with those of the outer-most beater gear 15, which is in mesh with the in-most beater gear 15 to thereby effect counter-rotation of the beaters 24.

The carrier 25 has extending therefrom a scraper blade 37 which rides along the inside surface of the wall of vessel 23.

A lid 12 covers the vessel 23. The 12 would typically be made of glass or other see-through material such as polycarbonate. The lid 12 includes an additives chute 13.

In use, a measured quantity of water is placed in the reservoir 27. This measured quantity is the same, irrespective of the intended load of vegetables to be added to the cooking vessel 23. Vegetable pieces are then placed in the cooking vessel 23 and the condensate collector chamber 39 is placed upon the reservoir 27. The cooking vessel 23 is then placed upon the condensate collector 39. The carrier 25, together with the scraper blade 37 and beaters 24 is then put in place. The lid 12 is then fitted. An interlock (not illustrated) between the fitted components can then be engaged. The heater 28 is then energised.

After some period of time, all or almost all of the water that had been in the reservoir will have been turned to steam. The steam enters the cooking vessel via the steam tube 22 and the perforations 40, causing the vegetables to be cooked. The steam condenses on the walls and lid of the vessel and on the vegetables and runs out of the cooking vessel through the perforations 40 into the condensate collector 39. Eventually there will be insufficient water to dissipate the energy of the heating element 28. A thermal control will then actuate. This action removes power from the element and at the same time causes the beating action to initiate. The beaters 24 are now turning and moving in a planetary manner about the vertical drive shaft segment 17''' by action of the planetary gear arrangement. The potatoes (and/or other vegetables) and additives are beaten into a paste or puree of user-controlled or programmed consistency. After a pre-set time, the beaters are de-energised. The user may now add such ingredients as desired and actuate a control to energise the beaters. Again, only if the lid is fitted and an interlocking connection made, will beating commence. If the lid is retained in position, mashed vegetables will be kept warm due to the cycling of the water-heating element. In practice, mashed potatoes for example will be kept warm for up to one hour in this way. After this time the quality of the food might deteriorate. Therefore, as an option, control of the cooking time is by means of a timer. When a pre-set time has expired, the beaters are energised. However, the water in the reservoir is not all turned to steam and so power to the heating element is reduced so that production of steam ceases and the reservoir acts as a source of moist heat. Mashed potatoes can be kept in an edible condition for many hours using this moist heat. This keeping period can in fact enhance the quality of the mashed potato.

It should further be appreciated that modifications and alterations obvious to those skilled in the art are not to be considered as beyond the scope of the present invention.

Also, instead of having the carrier rotate within the vessel, the carrier might be fixed in place and the vessel driven to rotate upon the base.

A further alternative might be to add a hopper to the lid. The contents of such a hopper can be discharged upon the action of the beater mechanism, or by means of a separate timer. Preferably, the timer would causes the ingredients from the hopper to be discharged into the cooking vessel only after the ingredients have been beaten for some time. It is important that a puree of sorts exists prior to the addition of milk or butter, otherwise the milk will drain through the cooking vessel via the perforations 40 into the condensate collector.

Collected condensate might be stored and used as a vegetable stock for soups and gravies for example.

What is claimed is:

1. A food processing appliance comprising:
    a reservoir to receive water,
    a heater to produce steam from any water in the reservoir,
    a vessel for containing food and being positioned to receive said steam, the vessel having a plurality of apertures therethrough, the apertures being sized to allow ingress of said steam to the vessel, yet curtail egress of any pureed food in the vessel therethrough,
    a carrier mounted movably with respect to the vessel,
    a drive means causing relative movement between the carrier and the vessel, and
    a beater extending into the vessel from the carrier.

2. The appliance of claim 1, further including a base in which the reservoir is located, and wherein the drive means includes a motor situated in the base.

3. The appliance of claim 2, wherein the reservoir includes a central, vertically oriented tube through which a vertical drive shaft extends to transmit output from the motor to the carrier.

4. The appliance of claim 3, wherein the vessel also includes a central tube through which said vertical drive shaft extends for transmitting output of the motor to the carrier.

5. The appliance of claim 4, wherein the central tube of the vessel has affixed to an upper end thereof a stationary gear, and wherein the beater includes a gear that meshes with the stationary gear.

6. The appliance of claim 5, including another beater mounted to the carrier and having a gear meshing with the gear of the first said beater.

7. The appliance of claim 1, wherein the heater has associated therewith a switch to deactivate the heater upon overheating as would occur, should all water from the reservoir the depleted.

8. The appliance of claim 1 further including control means governing operation of the motor and/or heater.

9. The appliance of claim 1, further comprising a condensate collection chamber positioned between the vessel and the reservoir.

10. The appliance of claim 9, further comprising a steam tube extending from the heater through the condensate collection chamber.

11. The appliance of claim 1, further comprising a scraper blade extending from the carrier and co-operating with the vessel to prevent accumulation of pureed vegetables on walls of the vessel.

12. The appliance of claim 11, wherein the scraper blade causes the vegetables to be fed toward the beater.

13. The appliance of claim 3, wherein the vessel also includes a central tube through which another vertical drive shaft extends for transferring output of the motor to the carrier.

* * * * *